`US005480691A`

United States Patent [19]

Hammer et al.

[11] Patent Number: 5,480,691
[45] Date of Patent: Jan. 2, 1996

[54] TUBULAR FOOD CASING HAVING IMPROVED PEELABILITY

[75] Inventors: Klaus-Dieter Hammer, Mainz; Leo Mans, Saulheim; Manfred Siebrecht, Wiesbaden, all of Germany

[73] Assignee: Hoechst Aktiengesellschaft, Frankfurt am Main, Germany

[21] Appl. No.: 277,039

[22] Filed: Jul. 19, 1994

[30] Foreign Application Priority Data

Jul. 19, 1993 [DE] Germany ............... 43 24 168.9

[51] Int. Cl.$^6$ ............... F16L 11/02; A22C 13/00
[52] U.S. Cl. ............... 428/34.8; 138/118.1; 426/105; 426/129; 428/422; 428/532
[58] Field of Search ............... 428/34.8, 422, 428/507, 532; 426/105, 127, 129; 138/118.1; 523/101

[56] References Cited

U.S. PATENT DOCUMENTS

| 3,744,784 | 7/1973 | Vaessen | 269/47 |
|---|---|---|---|
| 3,818,947 | 6/1974 | Rose | 138/118.1 |
| 3,898,348 | 8/1975 | Chiu et al. | 426/413 |
| 4,371,554 | 2/1983 | Becker | 426/243 |
| 4,543,282 | 9/1985 | Hammer et al. | 428/34.8 |
| 4,563,376 | 1/1986 | Hammer et al. | 428/34.8 |
| 4,571,922 | 2/1986 | Steffen | 53/397 |
| 5,230,933 | 7/1993 | Apfeld et al. | 428/34.8 |
| 5,358,765 | 10/1994 | Markulin | 428/34.8 |
| 5,370,914 | 12/1994 | Hammer et al. | 428/34.8 |

FOREIGN PATENT DOCUMENTS

| 0028858 | 5/1981 | European Pat. Off. . |
|---|---|---|
| 502431 | 9/1992 | European Pat. Off. . |
| 502432 | 9/1992 | European Pat. Off. . |
| 2546278 | 3/1977 | Germany . |
| 549161 | 11/1985 | Spain . |
| 1470726 | 4/1976 | United Kingdom . |

*Primary Examiner*—Charles R. Nold
*Assistant Examiner*—Rena L. Dye
*Attorney, Agent, or Firm*—Foley & Lardner

[57] ABSTRACT

The invention relates to a tubular food casing, in particular a sausage casing, based on cellulose, which has a coated inner side for improved peelability which is achieved by the presence of polytetrafluoroethylene in the coating solution.

19 Claims, No Drawings

TUBULAR FOOD CASING HAVING IMPROVED PEELABILITY

BACKGROUND OF THE INVENTION

1. Field of the Invention

The present invention generally relates to a tubular food casing, in particular a sausage casing, based on cellulose, which has a coated inner side for improved peelability. The invention furthermore relates to the coating solution used for this.

2. Description of Related Art

Untreated cellulose-based sausage casings conventionally adhere so strongly to the sausage filling, in particular to unsmoked or smoked emulsion for small sausages or simmered sausages, that they cannot be taken off without tearing the sausage filling surface.

Treated sausage casings, such as cellulose casings, which can be peeled more easily ("easy peel") are described in EP-A 0,502,432. These casings are coated on the inner side with alginate, alginic acid and/or chitosan. These release agents are similar to cellulose in their chemical structure. The coating is conventionally produced by charging with or spraying on a coating liquid. However, because of their high viscosity, alginate, alginic acid and chitosan cannot be sprayed in the amount which produces an optimal separation of the casing from the filling.

ES-A 549,161 describes the use of a mixture of lecithin and cellulose ether for coating cellulose sausage casings.

EP-A 0,502,431 discloses a particularly easily peelable cellulose casing having a coating which, in addition to alginate, chitosan and/or casein, further contains lecithin.

An easily removable cellulose-based sausage casing is also described in DE-A 2,227,438 (equivalent to U.S. Pat. No. 3,898,348). The casing is coated internally with a two-component mixture. One component is a water-soluble cellulose ether, the second an animal or vegetable oil, mineral oil, silicone oil and/or a water-soluble adduct of an alkylene oxide with a partial ester of a fatty acid.

The cellulose-based sausage casing according to DE-A 2,546,681 (equivalent to GB-A 1,470,726) has a similar internal coating. It contains as a first component a water-soluble cellulose ether, and as a second component a mixture of mono- and diglycerides of oleic acid. If required, a partial fatty acid ester of sorbitan or mannitan can additionally be used.

An internally coated sausage casing containing a mixture of mineral oil, an alkoxylated emulsifier sparingly soluble in mineral oil and an acetylated monoglyceride of a fatty acid is described in DE-A 2,300,338 (equivalent to U.S. Pat. No. 3,818,947).

Apart from the above-described cellulose-like compounds containing β-glucosidic bonds, such as chitosan or alginate, up to now no other easy-peel active components have been disclosed.

SUMMARY OF THE INVENTION

One object of the present invention is to provide a coating solution which can be applied simply to a cellulose casing and, even at a low application rate, leads to virtually 100% peelability of the casings coated therewith. Another object is that the coating solution should be sprayable.

Another object of the present invention is to provide a substrate coated with the coating solution. Still another object of the invention is to provide a casing containing cellulose with the coating solution.

Another object of the present invention is to provide a sausage foodstuff. Yet another object of the present invention is to provide a method for applying the coating solution to the casing or substrate.

In accomplishing the foregoing objectives, there has been provided according to one aspect of the present invention an aqueous coating solution for impregnating a cellulose containing food casing or substrate. The coating solution includes lecithin, water, and polytetrafluoroethylene (PTFE). In a preferred embodiment the coating solution further contains at least one oil and/or a wheat protein.

The present invention also provides a coated substrate which contains a cellulose containing substrate and a coating located on one side of said substrate. The coating present on the substrate contains about 450 to 800 mg/m$^2$ of lecithin and about 30 to 300 mg/m$^2$ of polytetrafluoroethylene.

The present invention also provides a tubular food casing which contains a cellulose containing casing, and a coating located on the inner side of said casing for improved peelability. The coating contains about 450 to 800 mg/m$^2$ of lecithin and about 30 to 300 mg/m$^2$ of polytetrafluoroethylene.

The present invention further provides a process for producing the coated food casing. The process includes the step of spraying the coating on the inner side of the casing. The present invention also provides a food product which includes a sausage product encased within the coated casing.

Further features, objects and advantages of the present invention will become apparent to persons skilled in the art from the detailed description of preferred embodiments that follows.

DETAILED DESCRIPTION OF THE PREFERRED EMBODIMENTS

The present invention comprises an aqueous, lecithin-containing coating solution for cellulose-based food casings which additionally contains polytetrafluoroethylene (PTFE).

A sprayable, homogeneous solution according to the present invention generally contains, in addition to water, preferably about 2 to 15% by weight, more preferably about 5 to 12% by weight, of lecithin, and generally about 0.5 to 6 % by weight, preferably about 1 to 3% by weight, of PTFE, each based on the total weight of the coating solution. The PTFE is employed as a weakly basic (pH about 8.5), aqueous dispersion, which has a preferred solids content of about 40 to about 60% by weight, relative to the total weight of the solution. In the dispersion, the PTFE particles have an average size of about 150 to about 300nm, preferably of about 200 to about 250 nm. In addition, to facilitate the subsequent shirring process and for the uniform distribution of the coating, the solution may optionally further contain oils preferably up to about 8% by weight, more preferably about 0.5 to 6% by weight, even more preferably about 2 to 5% by weight. The oil should not pass over into the filling and must be harmless in terms of food regulations. Silicone oil is the preferred choice of oils. Paraffin oils and waxes are also suitable. To stabilize the shirred casings, the solution may optionally further contain up to about 3% by weight, preferably about 0.2 to 3% by weight, of a wheat protein (wheat gluten). Generally, up to about 50% of the water, preferably about 20 to 50%, can be replaced by propane-1, 2-diol. As a result, the moisture content (i.e., water content) in the sprayed sausage casings can be controlled. The viscosity of the spray solution is generally between about 20 and 200 centipoise (cP), preferably between about 140 and 180 cP.

The use of PTFE for the impregnation of sausage casings is novel and part of the present invention. The internal coating of the sausage casing is preferably carried out simultaneously with the shirring operation, e.g., by so-called internal mandrel spraying. For this purpose, a hollow shirring mandrel is used. Sufficient aqueous or aqueous-alcoholic solution is sprayed on for the moisture content in the sausage casing to generally increase from about 8 to 10% by weight to about 14 to 18% by weight.

The present invention also relates to a tubular cellulose-based food casing having a coated inner side for improved peelability from the filling, which comprises the internal coating generally containing about 450 to 800 mg/m$^2$ of lecithin, about 30 to 300 mg/m$^2$ of polytetrafluoroethylene and, if required, up to about 500 mg/m$^2$ of an oil. The coating preferably contains about 100 to 500 mg/m$^2$ of the oil.

With conventional internal coatings, sausages could be peeled up to a maximum of 95 to 98%, which indicates that in the automatic peeling of 100 sausages, 2 to 5 of them still contained casing residues. The following examples show that almost 100% peelability is achieved with the coated casings of the present invention. Unless otherwise stated, "%" means "% by weight".

Example:
A cellulose hydrate sausage casing of caliber 23 mm (diameter=23 mm) and having a moisture content of 8 to 10% is sprayed through the internal mandrel during the shirring with a solution of the following composition:
10.0% lecithin;
33.0% propane-1,2-diol;
0.4% polyoxyethylene-sorbitan monooleate (Tween® 80);
0.2% polyethyleneglycol monoalkyl ether (HO—[CH$_2$—CH$_2$—O]$_n$—[CH$_2$]$_m$—CH$_3$, in which, on average, n=8 and m=12) (Genapol®x080);
12.5% silicone oil dispersion;
3.0% wheat protein (Amypro® SWP);
2.5% polytetrafluoroethylene dispersion; and
38.4% water.

The composition is applied in an amount such that the ready-to-fill shirred sausage casings (so-called "sticks") had a moisture content of 14 to 18%. The shirred casings were filled with emulsion for small sausages, reddened for about 20 min. at 60° C, then dried for 15 to 20 min., smoked for about 30 min., simmered for 30 min. and finally cooled. In the automatic peeling, the peelability of the sausages was between 99 and 100%.

Comparative Example:
The procedure according to the preceding example was followed, but a coating solution having the following composition was used:
10.0% lecithin;
35.0% propane-1,2-diol;
0.4% polyoxyethylene-sorbitan monooleate (Tween® 80);
0.2% polyethyleneglycol monoalkyl ether (HO—[CH$_2$—CH$_2$—O]$_n$—[CH$_2$]$_m$—CH$_3$, in which, on average, n=8 and m=12) (Genapol®x080);
12.5% silicone oil dispersion;
3.0% wheat protein (Amypro® SWP); and 38.9% water.

With the casings thus impregnated, smoked simmered sausages were likewise produced which were, however, only 95 to 98% peelable.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:
1. A tubular food casing comprising:
a cellulose containing casing; and
a coating located on the inner side of said casing for improved peelability, wherein said coating comprises an admixture of about 450 to 800 mg/m$^2$ of lecithin and about 30 to 300 mg/m$^2$ of polytetrafluoroethylene.
2. The food casing as claimed in claim 1, wherein said coating further comprises up to about 500 mg/m$^2$ of an oil.
3. The food casing as claimed in claim 2, wherein said oil is present in said coating in a range of about 100 to 500 mg/m$^2$.
4. The food casing as claimed in claim 2, wherein said oil is a silicone oil.
5. A tubular food casing as claimed in claim 1, wherein the coating further comprises wheat protein.
6. A tubular food casing as claimed in claim 1, wherein the coating further comprises propane 1,2-diol.
7. A tubular food casing as claimed in claim 1, wherein the coating is applied to the casing from an comprising lecithin, water, and polytetrafluoroethylene.
8. A tubular food casing as claimed in claim 7, wherein said coating solution is sprayable, and said lecithin is present in said solution in a range of about 2 to 15% by weight, and said polytetrafluoroethylene is present in a range of about 0.5 to 6% by weight, each based on the total weight of the solution.
9. A tubular food casing as claimed in claim 8, wherein said lecithin is present in said solution in a range of about 5 to 12% by weight, and said polytetrafluoroethylene is present in a range of about 1 to 3% by weight, each based on the total weight of said solution.
10. A tubular food casing as claimed in claim 8, wherein said coating solution further comprises up to about 8% by weight of at least one oil, based on the total weight of the solution.
11. A tubular food casing as claimed in claim 10, wherein said at least one oil is present in said solution in a range of about 0.5 to 6% by weight, based on the total weight of said solution.
12. A tubular food casing as claimed in claim 10, wherein said at least one oil is a silicone oil.
13. A tubular food casing as claimed in claim 7, wherein said coating solution further comprises up to about 3% by weight, of a wheat protein, based on the total weight of the solution.
14. A tubular food casing as claimed in claim 13, wherein said wheat protein is present in said solution in a range of about 0.2 to 3% by weight, based on the total weight of said solution.
15. A tubular food casing as claimed in claim 7, wherein the viscosity of said solution is between about 20 and 200 centipoise (cP).
16. A tubular food casing as claimed in claim 15, wherein the viscosity of said solution is between about 40 and 80 centipoise.
17. A tubular food casing as claimed in claim 7, wherein said coating solution further comprises propane-1,2-diol, and said propane-1,2-diol replaces up to about 50% of said water.
18. A tubular food casing as claimed in claim 17, wherein between about 20 to 50% of said water is replaced by said propane-1,2-diol.
19. A tubular food casing as claimed in claim 7, wherein the polytetrafluoroethylene is in the form of particles having an average size of about 150 to about 300 nm.

* * * * *

UNITED STATES PATENT AND TRADEMARK OFFICE
CERTIFICATE OF CORRECTION

PATENT NO. : 5,480,691
DATED : January 2, 1996
INVENTOR(S) : Klaus-Dieter HAMMER et al.

It is certified that error appears in the above-indentified patent and that said Letters Patent is hereby corrected as shown below:

Please note that in Column 4, line 19, Claim 7, after "an" insert -- aqueous coating solution".

In Column 4, line 54, Claim 16, "40 and 80" should read --140 and 180--.

Signed and Sealed this

Sixth Day of August, 1996

Attest:

BRUCE LEHMAN

*Attesting Officer*   *Commissioner of Patents and Trademarks*